Oct. 15, 1935. H. S. NEWCOMER 2,017,634
ANAMORPHOSING PROJECTION SYSTEM
Filed Nov. 30, 1932
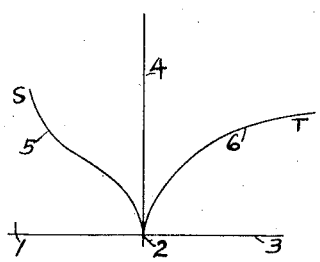
Fig. 1.
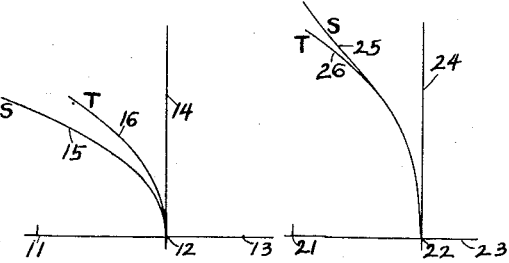
Fig. 2. Fig. 3.
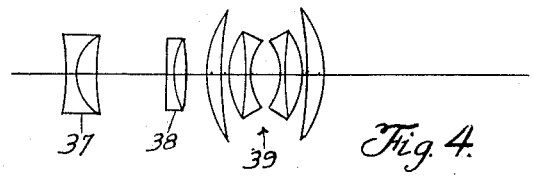
Fig. 4.
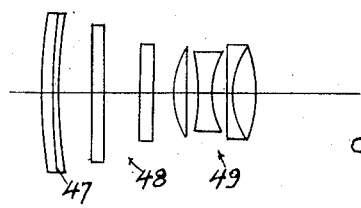
Fig. 5.
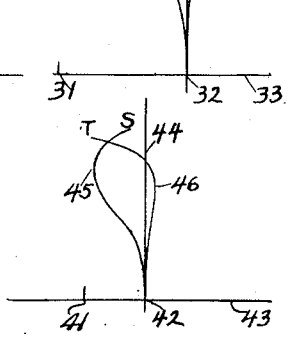
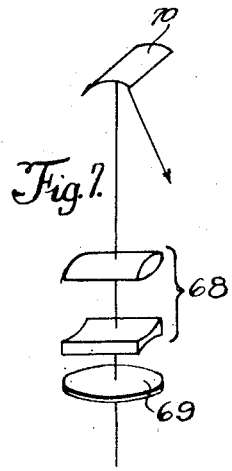
Fig. 6.
Fig. 7.
INVENTOR
Harry Sidney Newcomer
BY
Hammond & Littell
ATTORNEYS Patented Oct. 15, 1935

2,017,634

UNITED STATES PATENT OFFICE 2,017,634

ANAMORPHOSING PROJECTION SYSTEM

Harry Sidney Newcomer, New York, N. Y.

Application November 30, 1932, Serial No. 644,993

17 Claims. (Cl. 88—24)

This invention has for an object to provide a complete anamorphosing objective for cameras and projection apparatus with which improved definition may be obtained throughout the whole area of the image, both when photographing and upon projection.

There has been very little serious experience in the motion picture industry or in other commercial fields with unidimensionally enlarged or extended images.

The present invention has made it possible to produce horizontally compressed images on standard motion picture film under ordinary studio and outdoor conditions, such that the images on the film are critically sharp within the limits or tolerances imposed by good motion picture technique. Such motion picture film when projected with ordinary projection equipment, such as is currently found in projection rooms and theatres, shows a central and border definition not less good than that of ordinary commercial film. But it has been our experience that when such anamorphosed images are projected with the same projection equipment to which is added a well corrected anamorphoser so as to expand the picture horizontally on the screen, the lateral margins of the expanded picture are hazy or out of focus to a disconcerting extent. The identical situation holds true for amateur anamorphosed image film, either primary reversed film or reduction prints, when projected with the usual projection apparatus and anamorphoser.

An example of the advantages accruing from the use of the invention in the non-photographic field is found in the projection of printed matter as in financial news ticker projection apparatus. The present invention has made it possible to project unidimensionally extended images, as for instance the vertically expanded print in financial news projectors, in which the definition and legibility are greatly increased over that obtained with combinations heretofore available.

The unsatisfactory results that were for a long time observed in the application of anamorphosers to these purposes were not explained by a study of the aberrations of the projection lens system alone nor by a study of the aberrations of the anamorphoser alone.

It has been discovered in the course of the development of the present invention that if both the spherical lens system and the anamorphoser are suitably selected with reference to certain characteristics much clearer definition is obtained in the projected image and, in the case of photography, in the negative image. It was discovered that these critical characteristics of the spherical lens were in general charactei ɩ;tics of little importane and influence on the performance of the lens when used without the anamorphoser. In general they related to the form of the sagittal and tangential image surfaces of these lenses and in addition were such as become important because anamorphosed images usually require a degree of definition at the border of the spherical lens image greater than that which proves entirely satisfactory when there is no anamorphosis of the image.

Thus it was discovered that if the spherical lens system and the anamorphoser are suitably selected with reference to certain relationships between the respective curvatures of their tangential and/or sagittal image surfaces much clearer definition is obtained in the anamorphosed real image. The characteristics of the spherical lens system and of the anamorphoser should be such that the tangential and/or the sagittal convergence effects, positive or negative, for oblique rays of the anamorphoser tend to bring the tangential and/or the sagittal image surfaces of the spherical system nearer to the plane of the image than they are when the spherical system is used alone, the most curved surface being not appreciably more curved in the final result.

This invention proposes to secure a satisfactory unidimensionally enlarged or compressed image having sharp definition at the border and center simultaneously by the use of an appropriate optical system. In photography the result may be a motion picture negative film bearing a sharply defined unidimensionally compressed image. In projection the result may be a unidimensionally expanded (or contracted) sharply defined image thus anamorphosed for any purpose whatsoever, as for instance, in the projection of financial news to secure greater height of the letters without increasing the length of the line of print, or, for instance, in the projection of sharply defined wide screen motion pictures, by the use of an appropriate optical system and a motion picture film bearing horizontally compressed sharp images in which the degree of compression approximately corresponds to the amount of unidirectional expansion produced by the projection system. The appropriate optical system results from special relationships between the optical properties of two components, the spherical projection unit and the anamorphosing unit. The latter may in some instances include anamorphosing cylindrical reflecting units, as for instance, in financial news projectors.

The nature and objects of the invention will be better understood from a more detailed description and a consideration of the diagrams of the accompanying drawing forming a part hereof and in which—

Figure 1 indicates diagrammatically the positions with respect to the image plane of the sagittal and tangential images surfaces of an illustrative example of one particular Petzval lens which is typical of most commonly used projection lenses and in which the tangential and sagittal image surfaces are curved in opposite directions from the image plane, Figs. 2 and 3 indicate similarly the positions of the sagittal and tangential image surfaces of a Petzval projection lens and of a certain Rudolph planar type camera lens respectively, for both of which the image surfaces lie on one side of the image plane, Fig. 4 is a diagram showing an arrangement combining a spherical lens and an anamorphosing lens indicating the effect of the anamorphosing lens in flattening the tangential image surface of the planar type lens of Fig. 3.

Fig. 5 is a diagram showing the position with respect to the image plane of the sagittal and tangential image surfaces of a particular camera or projection lens having sharp marginal definition at the expense of the intermediate definition, together with a cross-section of a lens and of an associated prism anamorphoser designed for wide angle projection in one direction, in the plane of the paper, and narrow angle anamorphosed projection i. e., with increased magnification, in the other direction, perpendicular to the plane of the paper, Fig. 6 is a diagram showing a system similar to that of Fig. 5 but with the addition of a cylindrical mirror, the central and marginal astigmatism introduced by the mirror being largely corrected by a suitable arrangement of the spherical elements associated in this instance with a prism anamorphoser, and Fig. 7 is a diagram showing a system containing a concave cylindrical mirror associated with a refracting anamorphoser.

The figures as drawn show the sagittal and tangential image surfaces at or near the principal focal plane (image plane) of the spherical objective. This is a convenient way of representing the fundamental characteristics of the refraction in the system. It is substantially the condition obtaining when the system is used for photography. In projection the object to be projected is usually plane and situated near the principal focal plane of the objective. The image is usually received on a plane screen which is then conjugate with respect to the optical system to the plane of the object projected. The system having the characteristics shown in one of the figures has, when so used, an effect on the projected image which is entirely equivalent to that schematicized by the figure. The figures therefore represent the nature of the refraction whichever way the system is being used, for photography or for projection and whether the proximal one or the more distal one of the conjugated images is the object being reproduced or imaged by the system. The character of the refraction is the same, whichever way the light travels.

In motion picture projection the image plane or screen is in practice usually not perpendicular to the axis of the system. It is, however, usually at a substantial distance from the optical system and the lack of coincidence of the image with the plane of the screen because of the tilted position of the screen is usually an error of less magnitude than the errors here under discussion.

The errors under discussion represent convergence effects measurable in diopters or fractions of diopters by means of the formula, $B=A+D$, where D is the convergence effect in diopters along any ray produced by the system and A and B the convergence in diopters of the incident and refracted rays respectively measured at the refraction system, that is at its respective principal points. Thus the system has an effect D, which is measured in terms of A and B. If A is such as to place the object in a conjugate focal plane then B measures the distance of the image from a reference point and hence determines the lack of coincidence of the image with the other conjugate focal plane and vice versa. The actual distance of the image point from the plane is, however, when given by this simple relationship, measured in diopters as a difference between the convergence of a point in the plane and the convergence B (or A) of the image point. The above relationship being linear, this difference in diopters will be identical which ever conjugate image is under consideration, and since B and A are in general not equal, it follows that the actual distances from the two conjugate planes are in general not equal, and that associated with the more distant of the two planes may indeed be very large. This explains such distances being larger referred to the screen image, than distances arising from the usual tilting of screens.

Referring more particularly to the diagrams, in Fig. 1 the principal focal point of a lens lying to the left of the figure is at the point 2 on the axis 3 of the lens. The principal focal plane 4 passes through the point 2 and is perpendicular to the axis 3. At 5 is drawn a partial meridian section through the sagittal focal surface, the surface on which radial lines in the object plane are focused by the lens. At 6 is drawn a partial meridian section of the tangential focal surface, the surface on which tangential lines, i. e., circles, in the object plane are focused by the lens. The mark 1 on the axis 3 marks a distance along the axis 3 from the principal focal plane 4 equal to one hundredth of the focal length of the lens. The sagittal focal surface 5 curves appreciably from the principal focal plane 4 toward the lens. The tangential focal surface 6 curves appreciably from the principal focal plane 4 in the opposite direction. This represents the imagery conditions for the majority of projection lenses in common use. Throughout the drawing the letters S and T are applied to indicate, respectively, the sagittal and tangential image surfaces.

In Figs. 2 and 3 are drawn curves similar to those of Fig. 1, but for two different lenses having both focal surfaces to the lens side of the principal focal plane. The principal focal point of the one lens, a Petzval projection lens, is shown at 12 on the axis 13 of the lens. The principal focal plane is indicated at 14 and at 15 and 16 are shown meridian sections of the sagittal and tangential focal surfaces respectively. A distance from the principal focal point equal to one one-hundredth of the focal length is marked off at 11.

The principal focal point of the Rudolph planar type lens, is shown at 22 on the axis 23 of the lens. The principal focal plane is indicated at 24 and at 25 and 26 are shown meridian sections of the sagittal and tangential focal surfaces respectively. A distance from the principal focal point equal to one one-hundredth of the focal length is marked off at 21.

Neither lens is shown, as their particular construction as regards cross-section is not significant for the form of these surfaces. All three lenses are to be considered as located to the left of the figures.

In Fig. 4 is shown in cross-section parallel to the active plane of the anamorphoser an afocal cylindrical anamorphoser 37, 38 associated with a spherical lens 39 having focal surfaces as shown at 25 and 26 in Fig. 3. By afocal cylindrical anamorphoser is understood, for example, an optical system comprising positive and negative cylindrical elements or the equivalent with their axes all parallel and in the same plane, so spaced the one from the other as to produce a zero convergence effect on paraxial pencils originating in the two conjugate axial points of an object-image system comprising the spherical system with which the anamorphoser is associated and to which its afocal character relates. In other words the afocal anamorphoser can be removed from such a system without disturbing the positions of the object and image. In the Fig. 3, as a result of the negative oblique tangential convergence effect of the anamorphoser the tangential image surface 36 of the combination has assumed a position closer to the principal focal plane 34 than is the case of the surface 26 with respect to the plane 24. The sagittal focal surface 35 of the combination is approximately unchanged as compared with the condition represented in Fig. 3, although in the meridian at right angles to the one shown and at appreciably larger angles of obliqueness with the axis, it might have been moved substantially nearer the lens by virtue of the action of the anamorphoser. At 33 is drawn the optical axis of the system, at 32 the principal focal point and at 31 is marked off a unit of a scale applying only to the focal surface portion of the figure, namely a distance equal to one one-hundredth the focal length of the lens 39.

In Fig. 5 is shown in cross-section perpendicular to the active plane of the anamorphoser a prism anamorphoser 48 associated with a spherical lens 49 having the sagittal and tangential focal surfaces 45 and 46, respectively. In front of the prism anamorphoser is a correcting spherical lens 47 of focal length approximately equal to the object or projection distance. At 43 is drawn the optical axis of the lens 49, at 42 the principal focal point of the system, 47, 49, at 44 the principal focal plane and at 41 is marked off a unit of a scale applying only to the focal surface portion of the figure, namely a distance equal to one one-hundredth of the focal length of the lens 49. The scale for the image surfaces 45, 46 is one-half that of the similar portions of Figs. 1, 2 and 3.

In Fig. 6 is shown in cross-section parallel to the active plane a prism anamorphoser 58 associated with a spherical lens 59 similar to the lens 49 of Fig. 5 and a spherical correcting lens 57 having a focal length different from that of the object distance (57 to 63), in fact greater than the object distance, so as to introduce into the system 59, 58, 57 an axial astigmatism substantially neutralizing that of an anamorphosing cylindrical mirror 60. At 61 there is another mirror either plane or cylindrical with axis parallel to or in a meridian perpendicular to that of the axis of the mirror 60. The mirror 61 is not necessary but serves to erect the image inverted by the mirror 60. If it is cylindrical then the lens 57 has a focal length such that the axial astigmatism of the system, 59, 58, 57 substantially corrects the total axial astigmatism of the mirrors 60 and 61.

I have discovered that the astigmatism introduced by a convex cylindrical mirror and which for a very long time prevented the use of such mirrors in financial news projectors similar to the system of Fig. 6 can be corrected if the correcting lens 57 (see Patent No. Re. 19,056) has a focal length definitely greater than that of the object distance. In this instance the "object" (the projected image) is at 63 and the "image", the type figures or print being projected, at 62. The focal length of the lens 57 is ordinarily chosen equal to the optical path from 57 to 63. The amount that this focal length need be increased will depend on the particular construction of the anamorphoser 58 and the curvature of the mirror 60 (and 61 is curved). The astigmatism to be corrected introduced by the mirror, one or both, can be calculated from the formulæ—

$$\frac{n \cos^2 r}{q_1} = \frac{n \cos r - \cos i}{R_1} + \frac{\cos^2 i}{p_1}$$

for the tangential imagery, and $$\frac{n}{q_2} = \frac{n \cos r - \cos i}{R_2} + \frac{1}{p_2}$$

for the sagittal imagery where the $p$'s and $q$'s are the object and image distances from the reflecting surface respectively (or vice versa) and $n$ the relative refractive indices of the media on each side of the surface (equal to minus one for reflection at a mirror), $i$ and $r$ the angles of incidence and reflection and $R_1$ and $R_2$ the radii of the surface in the tangential and sagittal meridians, respectively. The formulæ are applied successively to each surface. The correcting lens should preferably have a cambrure with a negative surface proximal to the anamorphoser in accordance with the principles outlined in Patent No. Re. 19,056 and as indicated in the drawing.

In the illustrative example where the distance 57 to 63 is about 1¼ meters, the astigmatism introduced by the mirror 60 measured at the lens 57 could be about ⅓ diopter, which for a 6" lens 59 amounts to a focusing error in the plane of the paper (error in imagery of lines perpendicular to the paper) of about ⅓ inch unless corrected. The amount of lengthening of the focal length of the lens 57 necessary to correct this for any particular case can be determined by experiment on an optical bench.

The same result and effect will be accomplished and similarly corrected if the mirror 61 be made concave with axis perpendicular to the plane of the paper. Or either mirror may have the opposite curvature in the opposite meridians.

The anamorphoser 58 may be a prism anamorphoser as shown or a so-called afocal cylindrical anamorphoser. If the anamorphoser 58 be a cylindrical anamorphoser, as in Fig. 4, then for a combination with cylindrical mirror as shown in Fig. 6 a similar change in a correcting lens placed as at 57 will correct the astigmatism introduced by the cylindrical mirror. Or the same result can be accomplished by separating the two elements, positive and negative of the cylindrical anamorphoser so that it no longer is free from convergence effect on the pencils in its active plane.

In Fig. 7 at 70 is shown a cylindrical mirror with its axis parallel to the active plane of the anamorphoser 68, that is perpendicular to the axes of the cylinders of which the anamorphoser in this case is composed. The associated spherical system is shown at 69. This Fig. 7 might also serve to illustrate separation of the elements of the anamorphoser 68 so as to make unnecessary the use of a correcting lens, as at 57. The cylindrical lenses of the refracting anamorphoser, as at 68, may be corrected for the usual aberration by the usual means, or one or the other or both may be simple cylindrical lenses or their equivalent depending upon the purpose and degree of correction required and the magnitude of their openings.

I have discovered that this combination of reflecting and refracting anamorphosing elements has advantages possessed by neither alone, each correcting axial astigmatism introduced by the other and thus adding their anamorphosing actions while neutralizing their other errors.

I have found that this association of an astigmatic anamorphosing unit with a cylindrical mirror or mirrors acting as a supplementary anamorphosing unit to increase the anamorphosis is a simple and effective device to overcome the astigmatism necessarily introduced by the cylindrical mirror when the distance of the object (the screen) is short. Using such a combined system to obtain any given amount of anamorphosis or increased enlargement in one meridian less anamorphosis is required of the prism or cylindrical unit and errors, distortion and otherwise, introduced are less. It is also a simple and novel method of correcting for the astigmatism introduced by the curved mirror and which makes such a unit otherwise unfit for sharp projection.

This arrangement of Fig. 6 finds a particularly useful application in the projection of financial news.

The great majority of ordinary spherical motion picture projection lenses of commerce are more or less perfectly corrected for spherical aberration and are more or less perfectly corrected for color aberrations in the center of the picture. The border of the utilized field, while of necessity not having as good definition as the center, nevertheless, in general, has a fairly satisfactory definition. The lack of critically sharp definition which is present at the border of the picture is due in part to a defective color correction and to coma and also to curvature of the tangential and sagittal image surfaces. Those lenses which are commercially successful are, contrary to the usual opinion, of high quality and represent a serious effort to produce a good article. In the majority of these lenses the sagittal image surface curves appreciably towards the lens and the tangential image surface curves still more markedly away from the lens as in the example illustrated in the diagram, Fig. 1. In certain few cases the two image surfaces both curve towards the lens and then sometimes but not always the tangential image surface is somewhat less curved. An example of each of these latter possibilities is illustrated in Figs. 2 and 3. The tangential image surface may be nearly flat within the area to be used. These error characteristics of projection lenses seem to be a necessary accompaniment of the nearly perfect central definition and large aperture which these lenses have. They are not ordinarily, even in the unfavorable instances illustrated by Fig. 1, of such amount as to prevent the entire projected picture having a satisfactory definition when the lens is used for ordinary motion picture photography or for motion picture or other projection when in either case there is no anamorphosis.

In forming an anamorphosing projection system by merely adapting a corrected afocal anamorphoser to a commercial spherical projection lens the resultant screen image may show a haziness at the border not accountable for by the quality of either of the two systems judged separately including results in photography with the anamorphoser, where, although the angle of view may be larger, the focal lengths are then usually shorter and errors quantitatively less.

In order that the anamorphosed laterally extended screen image be satisfactory at the lateral margin as well as at the center, I have discovered that it is necessary, perhaps for physiological reasons, that the border definition of the spherical projection system alone be excellent. I have found that not many spherical lenses, in fact relatively few spherical lenses have suitable border definition for use with anamorphosers. But I have discovered further that this alone is not always sufficient for the best results and that in addition certain relationships must hold which in the case of motion picture projection make it necessary that the tangential (and/or sagittal) convergence effect due to the anamorphoser upon oblique pencils be not numerically additive to the curvature of the tangential (and/or sagittal) image surface of the spherical projection lens, at least not unless such curvature is nearly zero and the convergence effect of the former below a certain limit. Practically, there are the following possibilities which give combinations capable of satisfying the outlined screen image and photographic requirements:

1. A compound lens system consisting of an afocal anamorphosing unit which has a negative tangential convergence effect on oblique pencils lying in its active plane and a corrected spherical unit so designed that the tangential image surface of this unit in its useful portion is concave towards the unit, that is, lies substantially to the lens side of its principal focal plane.

2. A compound lens system consisting of an afocal anamorphosing unit which has a positive tangential convergence effect on pencils lying in its active plane and a corrected spherical unit so designed that the tangential image surface of this unit in its useful portion is convex towards the unit or lies substantially on the further side of its principal focal plane.

3. A compound lens system consisting of a corrected afocal anamorphosing unit which has a tangential convergence effect on oblique pencils lying in its active plane, which effect, positive or negative, in the useful region is not over 1/50 diopter and a corrected spherical unit so designed that the tangential image surface of this unit lies approximately in its principal focal plane.

It is possible to construct a cylindrical anamorphoser suiting any one of the above three conditions. One method of accomplishing this is discussed in the specification of my U. S. Patent No. 1,945,951.

Unless the anamorphoser be made to have definitely one of these characteristics it may have from an analytical point of view a rather indeterminate action due to the predominance of coma characteristics. But a study of the light distribution in the projection beam and the visibility characteristics of the light will usually resolve the action into a definite convergence effect, positive or negative. In addition the practical execution of the lens may change the convergence from the theoretical to some arbitrary and significant amount. Practically it seems not feasible to give the cylindrical type of anamorphoser a significant amount of oblique tangential positive convergence effect in the center of the visible spectrum without introducing too great an oblique color defect. For this reason I prefer for motion picture work that type of projection system in which the tangential image surface of the spherical unit in the region used curves slightly toward the unit or is nearly flat, that is substantially lies to the lens side of the principal focal plane, and the anamorphoser is designed to have a preponderantly slightly negative oblique tangential convergence effect.

It would seem off-hand that the lateral expansion of the picture by an anamorphoser would produce in itself a positive curvature of the field. However, the amount of this curvature with standard film and ordinary focal lengths and distances is usually not significant.

It is obvious that what has been said in regard to projection applies also to taking pictures.

I have so far discussed primarily the tangential convergence effects. In the projection of financial news or in geometrically similar systems where there is a considerable angular field in the meridian perpendicular to the active plane of the anamorphoser, the oblique sagittal convergence effect of the anamorphoser in that plane may be quite substantial. Thus I have discovered that it may be strongly positive and may require for suitable definition of the projected image the association with the anamorphoser of a spherical lens whose sagittal focal surface is convex towards the lens or at least in its useful portion lies on the further side of its principal focal plane.

In another type of anamorphosed projection used for instance in the projection of financial news, a prism anamorphoser and correcting spherical lens is used in association with a suitable anastigmatic lens. The anamorphoser with its correcting lens may have a positive oblique convergence effect sufficiently marked at large angles to give very poor definition with a spherical lens, one of whose image surfaces is appreciably concave towards the lens and appreciably nearer to the lens than its principal focal plane, a condition which obtains with most lenses available for such projection purposes. In fact the image surfaces of the spherical unit should be reasonably flat and well defined or at least give relatively sharp images in the focal plane as well as in the tangential and sagittal surfaces.

I have discovered in particular that one of the important requirements for satisfactory definition of such projected images is that the tangential and sagittal image surfaces intersect each other near the edge of the maximum utilized field of view.

I have discovered that the lens shown in Fig. 5, its focal surfaces being indicated at 45, 46, has suitably intersecting focal surfaces, a flat enough field and sufficiently good marginal definition to give very satisfactory images for projection with suitable prism anamosphosers up to half angles of about 23° in the inactive plane and about 9° or 10° in the active plane of the anamorphoser.

The lens shown in Fig. 5 has the following construction characteristics—

F=157 mm. Opening f/3.5

$r_1$=51 mm.     $L_1$ $n_D$=1.6062
$d_1$=7.47 mm.
$r_2$=infinity.            $v$=59.4
$e_1$=8.84 mm.
$r_3$=—114.30 mm. $L_2$ $n_D$=1.5811
$d_2$=5.61 mm.            $v$=40.9
$r_4$=46.41 mm.
$e_2$=10.69 mm.  $L_3$ $n_D$=1.5285
$r_5$=infinity.           $v$=51.8
$d_3$=2.40 mm.
$r_6$=46.41 mm.  $L_4$ $n_D$=1.6223
$d_4$=12.95 mm.            $v$=56.6
$r_7$=—75.64 mm.

It should be pointed out that the above illustrative examples by no means exhaust the possible applications of this invention. Thus for instance in the projection of images, as for example in the projection of financial news, it may be advisable to introduce into the system cylindrical reflecting mirrors, in such a manner as to introduce appreciable astigmatism of oblique rays. This astigmatism, amounting as it does to an axial and oblique tangential or sagittal positive or negative convergence effect, can enter into the sum total of oblique convergence effects of the spherical system and be corrected by a suitable selection of the same in the manner described.

The foregoing description is illustrative but is not intended as an exhaustive treatise on the possibilities of the invention.

I claim:

1. In a photographic or projection objective, the combination with a spherical lens system, the tangential image surface of which is curved in one direction from the focal plane of an afocal anamorphosing system whose oblique tangential imagery has a convergence effect which will substantially neutralize the curvature of the tangential image surface of the spherical lens system whereby the resultant tangential image surface of the complete combination is substantially flat.

2. In a photographic or projection objective, the combination with a spherical lens system the tangential image surface of which is curved away from the principal focal plane of the spherical lens, of an afocal anamorphosing system whose tangential imagery has a convergence effect of such sign and degree that when combined with said spherical lens system the anamorphosing system will cause a flattening of the tangential image surface whereby the tangential image surface of the complete objective is more nearly coincident with the principal focal plane than is the case with the tangential image surface of the spherical lens system alone.

3. In a photographic or projection objective, the combination with a spherical lens system the tangential image surface of which in its significant portion lies towards the lens system side of its principal focal plane, of an afocal anamorphosing system whose oblique tangential imagery has a negative convergence effect, the degree of which is such as to reduce the deviation of the tangential image surface of the spherical lens system from its principal focal plane.

4. In a photographic or projection objective, the combination with a spherical lens system the oblique tangential refraction of which in one portion is more positive than required to image in the principal focal plane, of an afocal anamorphosing lens system whose oblique tangential imagery has a negative convergence effect sufficient to approximately neutralize the excess convergence of the tangential imagery of the spherical lens system.

5. In a photographic or projection objective, the combination with a spherical lens system of an anamorphosing system comprising a refracting anamorphosing member, a cylindrical mirror with its axis parallel to one of the principal planes of the anamorphosing member and a spherical correcting lens for the refracting anamorphosing member, the correcting lens having a focal length greater than the object distance to reduce but not entirely neutralize the astigmatism introduced by the anamorphoser when pencils of non-parallel rays pass therethrough.

6. In a photographic or projection objective, the combination with a spherical lens system of an anamorphosing system in front of the lens system said anamorphosing system composed of a refracting anamorphosing member positioned in front of the lens system, a positive spherical correcting lens in front of the anamorphoser and a convex cylindrical mirror in front of the correcting lens having its axis parallel to the inactive plane of the anamorphosing member, the correcting lens having a focal length greater than the object distance substantially as and for the purpose described.

7. In a photographic or projection objective, the combination with a spherical lens system of an anamorphosing system comprising a refracting anamorphoser and a cylindrical mirror having its axis normal to the active plane of the anamorphoser whereby both extend the image unidirectionally in the same direction and whereby both introduce astigmatism into the system but of opposite signs whereby the astigmatism introduced by the anamorphoser tends to neutralize that introduced by the mirror.

8. A photographic or projection objective as defined in claim 7 wherein the anamorphoser is composed of cylindrical lens elements.

9. A photographic or projection objective as defined in claim 7 wherein the anamorphoser is composed of cylindrical lens elements separated sufficiently to introduce a positive convergence effect in the active plane of the anamorphoser sufficient to substantially neutralize the axial astigmatism introduced by the mirror.

10. In a photographic or projection objective, the combination with a spherical lens system whose tangential and sagittal focal surfaces are substantially coincident at the margin of the utilized field but slightly toward the lens from the focal plane, of an afocal anamorphoser the convergence of which for diagonal rays is such as to move the tangential focal surface toward the focal plane.

11. In a photographic or projection objective, the combination with a spherical lens system, the oblique tangential focal distances of which are different from the corresponding distances to the principal focal plane of an anamorphosing unit afocal for axial rays but with focal lengths for oblique tangential rays opposite in sign to the difference obtained by subtracting the first mentioned focal distances from the said distances to the principal focal plane whereby the corresponding aberrations tend to neutralize each other.

12. In a photographic or projection objective, the combination with a spherical lens system, the oblique tangential focal distances of which are shorter than the corresponding distances to the principal focal plane thereby causing the objective to have a tangential focal surface concave toward the lens system, of an afocal anamorphosing system which is divergent for oblique tangential pencils whereby the resultant image surface is flatter than the image surface of the lens system alone.

13. In a photographic or projection objective, the combination with a spherical lens system, the oblique tangential focal distances of which are longer than the corresponding distances to the principal focal plane thereby causing the objective to have a tangential focal surface convex toward the lens system, of an afocal anamorphosing system which is convergent for oblique tangential pencils whereby the resultant image surface is flatter than the image surface of the lens system alone.

14. In a photographic or projection objective, the combination with a spherical lens system, the tangential focal points for rays inclined moderately to the axis lying outside of the focal plane and progressively further from it as the rays are more inclined whereby the tangential image surface is curved in one direction from the focal plane, of an anamorphosing system substantially afocal for axial rays but causing convergence in the active plane for rays inclined moderately to the axis and progressively more as the rays are more inclined, such convergence effect of the anamorphosing system being positive or negative as the tangential image surface of the lens system is curved to the positive or negative side of the focal plane whereby the convergence effect of the anamorphosing system tends to neutralize the curvature of the tangential image surface of the lens system.

15. In a photographic or projection objective, the combination with a spherical lens system of an anamorphosing system in front of the lens system comprising a refracting anamorphosing member, a cylindrical mirror with its axis parallel to one of the principal planes of the anamorphosing member and a spherical correcting lens in front of the refracting anamorphosing member, the spherical lens system having tangential focal points for rays inclined moderately to the axis which lie at one side of the focal plane whereby the tangential imagery of the lens system is curved from the focal plane in one direction, the anamorphosing system being substantially afocal for axial rays but causing the convergence of rays inclined moderately to the axis in the active plane, which convergence is progressively greater for the rays more inclined to the axis, such convergence effect of the anamorphosing system being positive or negative as the tangential image surface of the lens system lies in back of or front of the focal plane respectively whereby the convergence effect of the anamorphosing system tends to neutralize the curvature of the tangential image surface of the lens system, the focal length of the correcting lens being different from the object distance to introduce, in conjunction with the anamorphoser, astigmatism of sign opposite to that introduced by the mirror whereby such astigmatism is partially neutralized.

16. In a photographic or projection objective the combination with a spherical lens system of an anamorphosing system comprising a refracting anamorphosing member a convex cylindrical mirror with its axis normal to the active plane of the anamorphosing member and a spherical correcting lens for the refracting anamorphosing member, the anamorphosing member being positioned between the spherical lens system having a tangential imagery curved from the focal plane and the anamorphosing system being substantially afocal for axial rays but having a convergence effect for rays inclined in the active plane, the convergence effect being of positive or negative sign as the said tangential imagery is convex or concave toward the lens respectively and of a magnitude corresponding to the degree of curvature whereby the tangential imagery curvature effect of the lens is substantially neutralized by the tangential imagery effect of the anamorphoser, the spherical correcting lens having a focal length greater than the object distance whereby said anamorphosing member has an axial astigmatism which tends to neutralize the axial astigmatism introduced by the mirror.

17. In a photographic or projection objective, the combination with a spherical lens system having an oblique tangential imagery curved toward the lens from its focal plane, of an anamorphosing system comprising a refracting anamorphosing member, and a concave cylindrical mirror with its axis parallel to the active plane of the anamorphosing member, the anamorphosing system as a whole being substantially afocal but having a tangential imagery for rays inclined in the active plane whose convergence is negative in sign, thus tending to neutralize the oblique convergence of the spherical lens system.

HARRY SIDNEY NEWCOMER.